United States Patent
Midy

(10) Patent No.: US 10,455,981 B2
(45) Date of Patent: Oct. 29, 2019

(54) COMBUSTION BOX

(71) Applicant: Olivier Joel Midy, Benahavis (ES)

(72) Inventor: Olivier Joel Midy, Benahavis (ES)

(*) Notice: Subject to any disclaimer, the term of this patent is extended or adjusted under 35 U.S.C. 154(b) by 431 days.

(21) Appl. No.: 15/307,838

(22) PCT Filed: Dec. 3, 2014

(86) PCT No.: PCT/ES2014/070890
§ 371 (c)(1),
(2) Date: Oct. 31, 2016

(87) PCT Pub. No.: WO2015/166117
PCT Pub. Date: Nov. 5, 2015

(65) Prior Publication Data
US 2017/0049269 A1   Feb. 23, 2017

(30) Foreign Application Priority Data

Apr. 29, 2014   (ES) ................. 201430574 U

(51) Int. Cl.
*A47J 37/07*   (2006.01)
*F24B 3/00*    (2006.01)

(52) U.S. Cl.
CPC ............. *A47J 37/079* (2013.01); *F24B 3/00* (2013.01)

(58) Field of Classification Search
CPC ..... A47J 37/0768; A47J 37/079; C10L 5/368; F23Q 13/04; F23B 90/02
See application file for complete search history.

(56) References Cited

U.S. PATENT DOCUMENTS

| | | | | | |
|---|---|---|---|---|---|
| 2,834,661 | A | * | 5/1958 | Chaplin | C10L 11/04 126/25 B |
| 2,955,029 | A | * | 10/1960 | Foote | A47J 37/0768 206/526 |
| 3,248,807 | A | * | 5/1966 | Janus | G09B 27/08 206/822 |
| 3,691,704 | A | * | 9/1972 | Novak | A63F 9/12 220/4.12 |
| 3,768,700 | A | * | 10/1973 | Stranicky | B65D 25/00 222/107 |
| 4,172,549 | A | * | 10/1979 | Yoshida | B65D 5/02 206/315.9 |
| 4,953,533 | A | * | 9/1990 | Witt | A47J 37/0768 126/25 B |
| 6,328,028 | B1 | * | 12/2001 | Cayse | A47J 37/079 126/25 B |

(Continued)

FOREIGN PATENT DOCUMENTS

WO   WO-0167936 A1 * 9/2001 .......... A47J 37/0768

*Primary Examiner* — Jorge A Pereiro
(74) *Attorney, Agent, or Firm* — Vedder Price, P.C.; Michael Turgeon

(57) ABSTRACT

A combustion box comprising an inner casing with a tubular configuration and hollow therein, which is housed in a volumetric housing, the casing running through the inside of the housing, and each one of the ends of the inner casing is in contact with the inner contour of the volumetric housing, such that said ends pass through the inner contour of the volumetric housing, there being an inner intermediate space between the inner contour of the housing and the inner casing, and said intermediate space containing a flammable solid material.

17 Claims, 3 Drawing Sheets

(56) References Cited

U.S. PATENT DOCUMENTS

| | | | | |
|---|---|---|---|---|
| 7,670,392 B2* | 3/2010 | Correa | ............... | C10L 5/36 44/530 |
| 7,789,919 B2* | 9/2010 | Helms, Jr. | ............... | A47J 37/0768 44/530 |
| 7,823,576 B2* | 11/2010 | Timmons | ............... | C10L 11/04 126/25 B |
| 9,322,547 B2* | 4/2016 | Wares | ............... | F23B 90/02 |
| 2007/0044377 A1* | 3/2007 | Correa | ............... | C10L 5/36 44/540 |
| 2008/0000467 A1* | 1/2008 | Dudley | ............... | A47J 37/079 126/25 B |
| 2008/0092437 A1* | 4/2008 | Helms | ............... | A47J 37/0768 44/520 |
| 2009/0007826 A1* | 1/2009 | Wares | ............... | C10L 5/36 110/233 |
| 2009/0205627 A1* | 8/2009 | Timmons | ............... | C10L 5/368 126/25 B |
| 2009/0277437 A1* | 11/2009 | Fischer | ............... | A47J 37/079 126/25 B |
| 2009/0277438 A1* | 11/2009 | Fischer | ............... | C10L 5/36 126/25 B |
| 2010/0263270 A1* | 10/2010 | Correa | ............... | C10L 5/36 44/530 |
| 2011/0083658 A1* | 4/2011 | Dudley | ............... | A47J 37/079 126/25 B |
| 2012/0115092 A1* | 5/2012 | Wares | ............... | F23B 90/02 431/2 |

* cited by examiner

41

42

COMBUSTION BOX

RELATED APPLICATIONS

This application is a National Phase of PCT Patent Application No. PCT/ES2014/070890 having International filing date of Dec. 3, 2014, which claims the benefit of priority of Spanish Patent Application No. U201430574 filed on Apr. 29, 2014. The contents of the above applications are all incorporated by reference as if fully set forth herein in their entirety.

OBJECT OF THE INVENTION

The aim of the present invention application is to register a combustion box, which includes significant innovations and advantages in comparison to the techniques used to date.

More specifically, the invention proposes the development of a combustion box, which, given its specific arrangement and properties, makes it possible to start combustion simply, effectively and favourably, and without the need for added products. Furthermore it is easy to manufacture.

FIELD AND BACKGROUND OF THE INVENTION

Various devices for igniting solid fuel are known in the current state of the art, which when inserted in different containers are burnt to start a bigger combustion.

Although such devices usually have a high performance, they sometimes have an insufficient amount of fuel.

Furthermore, they must even incorporate appropriate chemical products in order to start combustion.

The container arrangement used does not have an appropriate geometry for appropriate combustion and appropriate air circulation, and specifically for an appropriate chimney effect, and does not allow them to be adapted to any barbecue.

The general shape of the container does not enable high performance to be obtained when used.

Moreover, it sometimes has a configuration that makes it difficult to manufacture.

The present invention helps to resolve the present problem, since it enables a desired combustion to be ignited simply, effectively and favourably, with appropriate air circulation, and moreover being easy to use and manufacture, without the need to incorporated added chemical products.

SUMMARY OF THE INVENTION

The present invention has been developed to provide a combustion box, which is essentially characterised in that it comprises an inner casing with a tubular configuration and hollow therein, which is housed in a volumetric housing, the casing running through the inside of the housing, and each one of the ends of the inner casing is in contact with the inner contour of the volumetric housing, such that said ends pass through the inner contour of the volumetric housing, there being an inner intermediate space between the inner contour of the housing and the inner casing, and said intermediate space containing a flammable solid material.

In an alternative embodiment, in the combustion box, the volumetric housing has an essentially cubic configuration.

In addition, in the combustion box, the contact of the ends of the casing with the inner contour of the volumetric housing is carried out on two opposite faces of said volumetric housing.

In another alternative embodiment, in the combustion box, the volumetric housing has an essentially cylindrical configuration.

Additionally, in the combustion box, the contact of the ends of the casing with the inner contour of the volumetric housing is carried out on the two flat opposite faces of said volumetric housing.

In another alternative embodiment, in the combustion box, the volumetric housing has an essentially spherical configuration.

The combustion box preferably comprises two essentially horizontal sheets, the casing separating and passing through the same, inside the housing, and which are adjusted on the inner contour of the housing.

In an alternative embodiment, in the combustion box, the casing results from folding a laminate body.

In an alternative embodiment, in the combustion box, the housing results from folding a laminate body.

In the combustion box, the casing, housing and the sheets are preferably made of cardboard or similar.

Alternatively, in the combustion box, the ends of the casing have a seal enabled so as to be opened manually from the outside.

In an alternative embodiment, in the combustion box, the inner casing is essentially a square-shaped tube.

In an alternative embodiment, in the combustion box, the inner casing is essentially a round-shaped tube.

In the combustion box, the flammable solid material is preferably coal or another material with similar properties.

Additionally, in the combustion box, the outer contour thereof is covered in a plastic or other film.

In the combustion box, the casing is preferably divided into at least two vertically arranged sectors.

Additionally, the combustion box incorporates at least one outer support.

Alternatively, in the combustion box, the outer support results from folding a laminate body.

In the combustion box, the outer support is preferably made of cardboard or similar.

Due to the present invention, a desired combustion is started and carried out simply, effectively and favourably, with appropriate air circulation, and moreover being easy to use and manufacture.

Other characteristics and advantages of the combustion box shall be made clear in the description of a preferred but not exclusive embodiment of the invention, illustrated by way of non-limiting examples in the accompanying drawings, in which:

DESCRIPTION OF SPECIFIC EMBODIMENTS OF THE INVENTION

Figure 1:
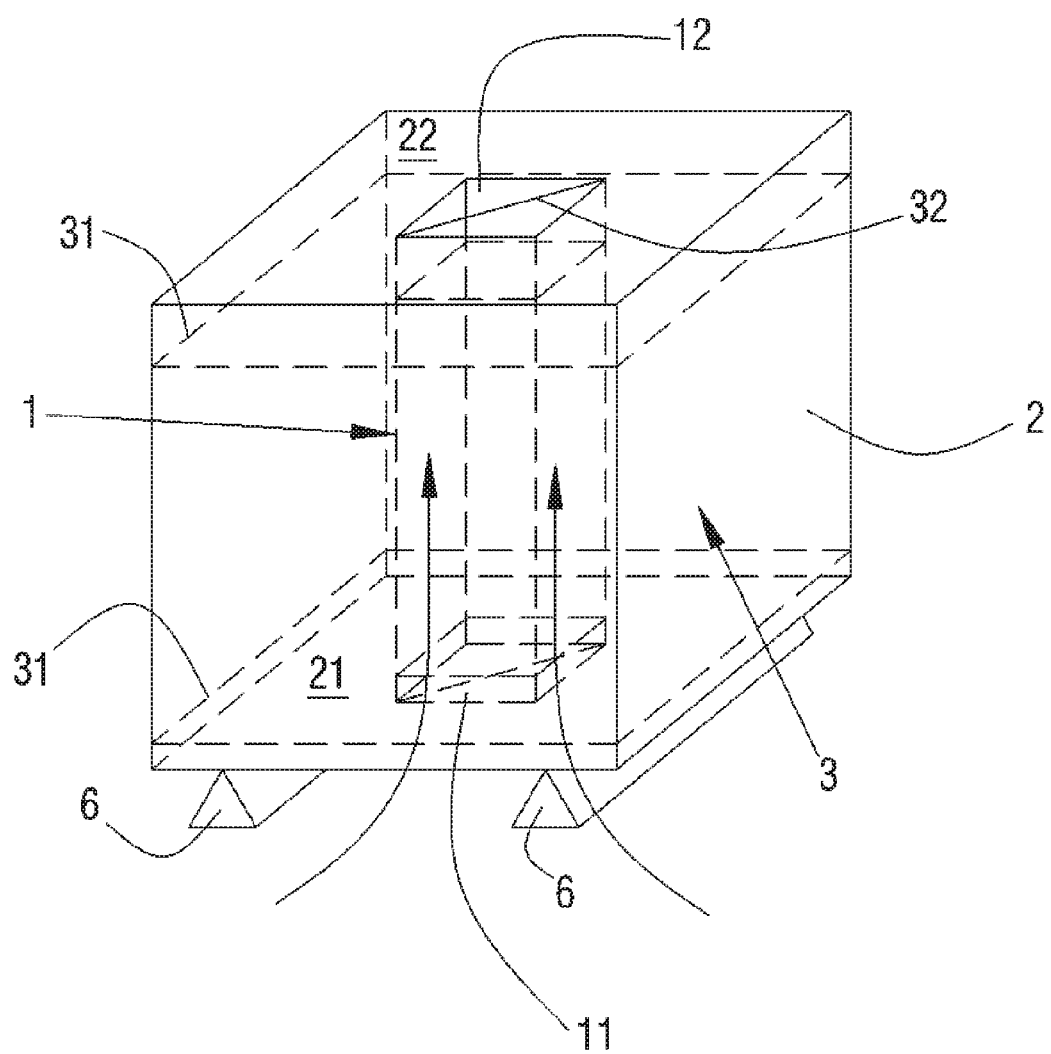
FIG. 1.—Is a schematic perspective view of a preferred embodiment of the combustion box of the present invention.

As shown schematically in the figures, the combustion box comprises an inner casing 1 with a tubular configuration and hollow therein, which is housed in a volumetric housing 2, the casing 1 running through the inside of the housing 2, and each one of the ends 11, 12 of the inner casing 1 is in contact with the inner contour of the volumetric housing 2, such that said ends 11, 12 pass through the inner contour of the volumetric housing 2, there being an inner intermediate space 3 between the inner contour of the housing 2 and the inner casing 1, and said intermediate space 3 containing a flammable solid material 5.

As shown schematically in FIG. 1, the combustion box of the invention comprises a hollow inner casing 1, which is housed inside a volumetric housing 2.

In this preferred embodiment, the casing 1 has a square tube-shaped geometry, and the housing 2 is essentially cube shaped, although other embodiments may have different geometric shapes that are compatible with the arrangement initially described.

Each one of the ends 11, 12 of the inner casing 1 is in contact with the inner contour of the housing 2. In this preferred embodiment, the contact of the ends 11, 12 is carried out on two opposite faces 21, 22 of the inner contour of the housing 2 since the housing 2 is a cube.

There is an inner intermediate space 3 between the casing 1 and the inner faces of the housing 2.

In the intermediate space 3 there are two sheets 31 that are essentially horizontal and the casing 1 passes through the same. Said sheets 31 are in the area close to the faces 21, 22, and are adjusted on the inner contour of the housing 2.

Figure 3:
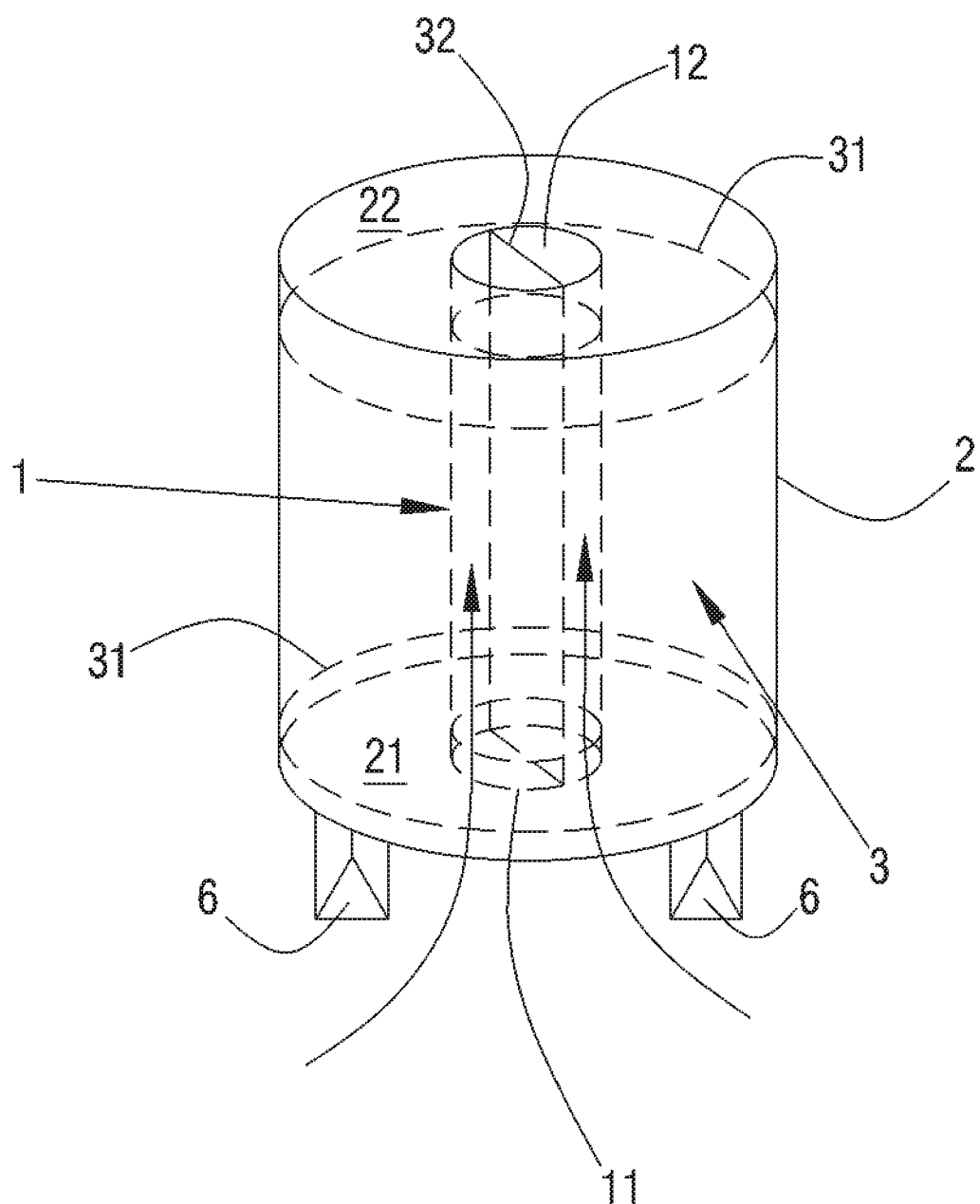
FIG. 3.—Is a schematic perspective view of another preferred embodiment of the combustion box of the present invention.

In other preferred embodiments, in which the volumetric housing 2 is cylindrical, as shown schematically in FIG. 3, the faces 21, 22 correspond to the lower and upper base, respectively, of said cylindrical-shaped volumetric housing 2. The sheets 31 are similarly arranged in the area close to the faces 21, 22, and adjusted on the inner contour of the housing 2, and the casing 1 has a round tube-shaped geometry.

Figure 2:
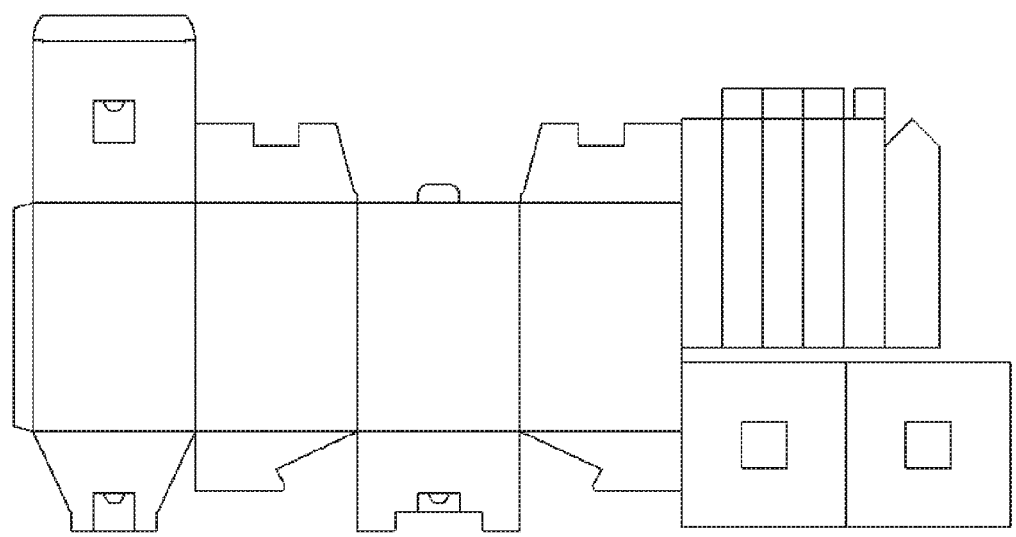
FIG. 2.—Is a schematic view of a number of laminate bodies, prior to folding or bending, which create a preferred embodiment of the combustion box of the present invention.
Figure 2:
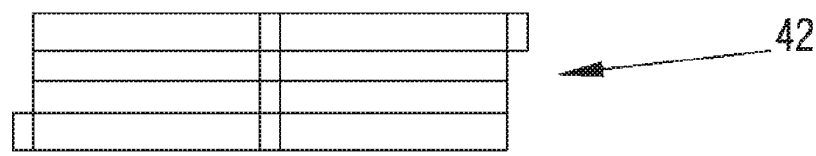

In this preferred embodiment represented schematically in FIG. 1, the casing 1 and the housing 2 result from folding a laminate body 41, which is represented schematically in FIG. 2.

The casing 1, housing 2 and sheets 31 are made of cardboard or similar, which is easily combustible.

Bending and folding the laminate body 41 of FIG. 2, eventually configures the inner casing 1 and the housing 2, with the reinforcement sheets 31, which are appropriately positioned between them, and with the inner intermediate space 3, as may be seen in the schematic representation of FIG. 1.

The combustion box of the invention further incorporates a number of outer supports 6, which enable it to be positioned on the ground or support surface, thus resulting in a lower useful free space between the end 11 of the casing 1 and the ground or support surface.

In this preferred embodiment, the outer supports 6 result from folding a laminate body 42, represented schematically in FIG. 2, and are made out of cardboard or similar, which is easily combustible.

The casing 1 is divided into two vertically arranged sectors, which are enabled so as to house the outer supports 6 when they are not in use. In this preferred embodiment, the division of the two sectors is carried out via an inner partition 32 arranged diagonally, as shown in FIG. 1, or also in the other preferred embodiment shown in FIG. 3.

When marketed and distributed before use, the outer supports 6 are inserted in the two vertically arranged sectors of the aforementioned casing 1, and are removed by the user in order to be appropriately positioned on the ground or support surface.

Inside the intermediate space 3, and between the sheets 31 that are close to the faces 21, 22, there is a flammable solid material 5 (not shown in the drawings). In this preferred embodiment, said flammable solid material 5 is coal. In other embodiments, they may be other different materials with appropriate and similar properties, which are known in the state of the art, such as charcoal, coco briquettes, nut shells, firewood, etc.

The combustion box of the invention is marketed and distributed with the flammable solid material 5 already introduced previously in the inner intermediate space 3.

The sheets 31 help keep the flammable solid material 5 confined and packed together, and thus prevent it from possibly being vibrated and shaken during the transfer and movement of the combustion box of the invention.

The sheets 31 also keep the casing 1 located in its appropriate position inside the housing 2.

When in use, the combustion box must be positioned where the combustion is to take place.

The user must also manually open the ends 11, 12 of the casing 1, at its area of contact with the inner contour of the housing 2 (in FIGS. 1 and 3, the faces 21, 22), and remove the outer supports 6 from inside and position the housing 2 on the ground or support surface using said outer supports 6. Manually opening of the ends 11, 12 may be carried out via manually tearing die-cut lines arranged for this purpose, or also by a number of adhesive tabs arranged on the ends 11, 12 so that they may be manually operated from the outside, for example.

In order to carry out the lighting operation, the user must manually hold the housing 2, and then, via a lighter, matches or other similar means, set fire to the end 11 situated at the lower portion of the casing 1, and specifically the partition 32 that is in the casing 1 itself. The partition 32 may have some type of projection in the area of the end 11 to facilitate said lighting operation.

Following initial lighting, the user must wait a few seconds to ensure said lighting is continuous, and then immediately position the housing 2 on the ground or support surface using the outer supports 6, as may be seen in FIGS. 1 and 3.

Following initial lighting, the explained geometric arrangement of the casing 1 means that appropriate air circulation is produced from bottom to top, as indicated by the arrows in FIG. 1 or 3, and with a resulting chimney effect, thus favouring the aforementioned lighting and its resulting extension to a desired bigger combustion in the inner intermediate space 3, in which the coal is housed.

Therefore, it is necessary for the outer supports 6 to be arranged such that they do not interfere in the lower useful free space between the end 11 of the casing 1 and the ground or support surface created via the same outer supports 6, and thus enable appropriate air circulation from bottom to top, as indicated by the arrows in FIG. 1 or 3.

The combustion box of the present invention is especially indicated and appropriate for the use thereof as combustion in, for example, a barbecue, oven, or other diverse uses, wherein a number of flammable solid materials 5 such as coal, charcoal, coco briquettes, nut shells, firewood, etc. may be common.

The combustion box of the present invention is covered with a plastic or similar film, to thus prevent the accumulation of dust caused by the coal housed in the intermediate space 3, thus preventing dirt and protecting against humidity (which is very important for use in boats, for example) and the resulting inconveniences for the user, which constitutes a clear advantage compared to other solutions known in the current state of the art.

Its particular configuration enables an appropriate amount of flammable solid material 5 to be contained inside, as well as appropriate air circulation for the initial combustion of the end 11 of the casing 1.

The outer contour of the housing 2 may have instructions and drawings for use, in order to facilitate an appropriate use by the user.

The combustion box of the invention is extremely clean to transport or store before being used, unlike what happens in other solutions known in the current state of the art.

Furthermore, the manufacturing thereof is extremely simple and easy to execute.

The details, shapes, dimensions and other accessory elements, as well as the materials used to manufacture the combustion box of the invention, may be suitably substituted for others which are technically equivalent, and do not diverge from the essential nature of the invention, nor the scope defined by the claims included below.

What is claimed is:

1. A combustion box comprising: an inner casing (1) with a tubular configuration defining a hollow therein, which is disposed in a volumetric housing (2), wherein the inner casing (1) extends through the inside of the volumetric housing (2), and each one of the ends (11, 12) of the inner casing (1) is in contact with one of opposite faces (21, 22) of the inner contour of the volumetric housing (2), wherein an inner intermediate space (3) is defined between the inner contour of the volumetric housing (2) and the inner casing (1), and the intermediate space (3) contains a flammable solid material (5), wherein an outer support (6) is removably disposed within the inner casing in a non-use configuration, further comprising two essentially horizontal sheets (31), the inner casing (1) separating and passing through the same, inside the housing (2) and are adjusted on the inner contour of the volumetric housing (2).

2. The combustion box, according to claim 1, wherein the volumetric housing (2) has an essentially cubic configuration.

3. The combustion box, according to claim 1, wherein the volumetric housing (2) has an essentially cylindrical configuration.

4. The combustion box, according to claim 1, wherein the volumetric housing (2) has an essentially spherical configuration.

5. The combustion box, according to claim 1, wherein the casing (1) results from folding a laminate body.

6. The combustion box, according to claim 1, wherein the housing (2) results from folding a laminate body.

7. The combustion box, according to claim 1, wherein the casing (1), housing (2) and sheets (31) are made from cardboard or similar.

8. The combustion box, according to claim 1, wherein the ends (11, 12) of the casing (1) have a seal enabled so as to be opened from the outside.

9. The combustion box, according to claim 1, wherein the inner casing (1) is essentially a square-shaped tube.

10. The combustion box, according to claim 1, wherein the inner casing (1) is essentially a round-shaped tube.

11. The combustion box, according to claim 1, wherein the flammable solid material (5) is coal or another material with similar properties.

12. The combustion box, according to claim 1, wherein the outer contour thereof is covered with a plastic or similar film.

13. The combustion box, according to claim 1, wherein the casing (1) is divided into at least two vertically arranged sectors.

14. The combustion box, according to claim 1, wherein the outer support (6) is disposed in contact with a lower base of the volumetric housing (2) defined by one of the opposite faces (21) in a use configuration.

15. The combustion box, according to claim 14, wherein the outer support (6) is made of cardboard or similar.

16. The combustion box, according to claim 1, wherein the outer support (6) results from folding a laminate body.

17. The combustion box, according to claim 16, wherein the outer support (6) is made of cardboard or similar.

* * * * *